(12) United States Patent
Edwards

(10) Patent No.: US 9,469,371 B2
(45) Date of Patent: *Oct. 18, 2016

(54) CRANKARM AND CRANKSET COMPRISING SAME

(71) Applicant: Craig Hawley Edwards, La Canada, CA (US)

(72) Inventor: Craig Hawley Edwards, La Canada, CA (US)

(*) Notice: Subject to any disclaimer, the term of this patent is extended or adjusted under 35 U.S.C. 154(b) by 450 days.

This patent is subject to a terminal disclaimer.

(21) Appl. No.: 14/062,548

(22) Filed: Oct. 24, 2013

(65) Prior Publication Data

US 2014/0047948 A1   Feb. 20, 2014

Related U.S. Application Data

(63) Continuation of application No. 12/927,592, filed on Nov. 18, 2010, now Pat. No. 8,590,423.

(60) Provisional application No. 61/263,393, filed on Nov. 22, 2009.

(51) Int. Cl.
*B62M 3/00* (2006.01)

(52) U.S. Cl.
CPC ............ *B62M 3/00* (2013.01); *B62M 3/003* (2013.01); *Y10T 74/2164* (2015.01)

(58) Field of Classification Search
CPC ........... Y10T 74/2164; Y10T 74/2165; Y10T 74/2167; B62M 3/00; B62M 3/003; B62M 3/02; B62M 3/04; B62M 3/06
See application file for complete search history.

(56) References Cited

U.S. PATENT DOCUMENTS

| | | | | |
|---|---|---|---|---|
| 5,010,785 A * | 4/1991 | Romero | ......... | B62M 3/00 74/579 R |
| 5,623,856 A * | 4/1997 | Durham | ......... | B62M 3/00 74/579 R |
| 5,766,106 A * | 6/1998 | Edwards | ......... | B62M 9/105 474/160 |
| 6,058,803 A * | 5/2000 | Yamanaka | ......... | B21J 5/00 280/259 |
| 6,314,834 B1 * | 11/2001 | Smith | ......... | B62M 3/00 74/594.1 |
| 6,443,033 B1 * | 9/2002 | Brummer | ......... | B62M 3/00 280/259 |
| 7,263,914 B2 * | 9/2007 | Ording | ......... | B62K 19/16 74/594.1 |
| 7,527,277 B2 * | 5/2009 | Nonoshita | ......... | B62M 3/00 280/259 |
| 7,530,291 B2 * | 5/2009 | Lin | ......... | B62M 3/00 74/594.1 |
| 7,650,817 B2 * | 1/2010 | Shiraishi | ......... | B62M 3/003 280/259 |

(Continued)

OTHER PUBLICATIONS

Information Disclosure Statement for U.S. Appl. No. 12/927,592.*

(Continued)

*Primary Examiner* — Richard W Ridley
*Assistant Examiner* — Brian McGovern
(74) *Attorney, Agent, or Firm* — David O. Simmons

(57) ABSTRACT

A crankset comprises an axle assembly, a drive-side crankarm, and a non-drive crankarm. The drive-side crankarm is attached at a first end portion thereof to a first end portion of the axle assembly. The non-drive crankarm is attached at a first end portion thereof to a second end portion of the axle assembly. Each one of the crankarms has a plurality of longitudinal holes therein extending between the first and second end portions thereof. The longitudinal holes each extend through an end face of a respective one of the crankarms at the first end portion thereof. The drive-side crankarm is bent inwardly toward the second end portion of the axle assembly after the longitudinal holes are formed therein. Only one of the longitudinal holes of the drive-side crankarm intersects an axle fastener engagement hole that extends through the first end portion of the drive-side crankarm.

9 Claims, 6 Drawing Sheets

(56) References Cited

U.S. PATENT DOCUMENTS

| | | | |
|---|---|---|---|
| 7,770,492 B2* | 8/2010 | French | B62M 3/00 74/594.1 |
| 7,784,378 B2* | 8/2010 | Schlanger | B62M 3/00 74/594.1 |
| 2005/0081678 A1* | 4/2005 | Smith | B62M 3/003 74/594.1 |
| 2012/0042746 A1* | 2/2012 | Nonoshita | B62M 3/00 74/594.2 |

OTHER PUBLICATIONS

Rotor & Speedplay, roues artisanales.com, date published: Jun. 3, 2009, URL:http:www.rouesartisanales.com/article32190884.html.*

* cited by examiner

CRANKARM AND CRANKSET COMPRISING SAME

CROSS REFERENCE TO RELATED APPLICATIONS

This continuation patent application claims priority from co-pending U.S. Non-provisional patent application having Ser. No. 12/927,592, filed 18 Nov. 2010, entitled "CRANKARM AND CRANKSET COMPRISING SAME", which claims priority from co-pending U.S. Provisional Patent Application having Ser. No. 61/263,393 filed 22 Nov. 2009 entitled "BICYCLE CRANKSET SPIDER AND CHAIN RINGS", both of which have a common applicant herewith and are being incorporated herein in its entirety by reference.

FIELD OF THE DISCLOSURE

The disclosures made herein relate generally to cranksets for human powered machines and, more particularly, to cranksets and bottom bracket axle assemblies for bicycles.

BACKGROUND

In the road bicycle market, there are primarily two cranksets types: standard and compact. Compact cranksets can typically offer a lower gear ratio than standard cranksets. Both of these crankset types employ the same basic configuration, which has been standardized on cranksets for decades. This configuration consists of a series of chainring bolts and chainring nuts that jointly fasten a large chainring and a small chainring together and trap a spider of the crankset between the two chainrings. Cranksets can also have a single chainring or more than two chainrings. In this manner, the chainrings are fixed to the chainring spider of the crankset With this approach, the chainring bolts holes in the chainrings and corresponding holes in the spider must line up so that the mating pairs of the chainring bolts and chainring nuts can bass through both chainrings and the spider and engage each other. These chainring bolt holes in the spider form a circular pattern called a bolt circle, which is concentric with a rotational axis of the crankset.

A skilled person will appreciate that the weight of a bicycle is extremely important, especially for a competitive cyclist or bicycle racer. Because bicycles are manually powered, weight has a tremendous effect on energy utilization and performance in powering a bicycle. Furthermore, because a crankset is one of the more large and heavy components of a bicycle, reducing weight of a crankset can significantly impact the overall weight of the bicycle. Still further, because of the rotational movement of the crankset for the purpose of transferring power to the rear wheel of a bicycle (e.g., via a chain), weight of the crankset can have a significant impact on the energy required to rotationally accelerate the crankset from one rotational speed to another. This can be quite important to a competitive cyclist or a bicycle racer as it influences how quickly and efficiently they can accelerate their bicycle from one road speed to another.

Although weight of the crankset is important, flexural stiffness of the cranks is also important. A crankset that is quite light, but that exhibits considerable flexure when being pedalled will generally exhibit less than optimal performance. This is because flexing within any element of the crankset will typically result in the loss of energy that would otherwise contribute to powering the bicycle. Accordingly, weight of the crankset must be balanced with its flexural stiffness.

SUMMARY OF THE DISCLOSURE

Embodiments of the present invention relate to a cranksets used for transmitting power from legs of an operator of a leg-powered machine. Advantageously, cranksets configured in accordance with the present invention are extremely light and stiff relative to prior art cranksets. A bicycle is an example of such a leg-powered machine in which a crankset configured in accordance with the present invention can be used. Other examples of leg-powered machines in which a crankset configured in accordance with the present invention can be used include, but are not limited to, a helicopter, a tri-cycle, a three or four-wheeled vehicle, etc.

In one embodiment of the present invention, a drive-side crankarm for a crankset includes an elongated crankarm body having a first end portion and a second end portion. An axle fastener engagement hole extends through the elongated crankarm body at the first end portion thereof. A pedal axle mounting hole extends through the elongated crankarm body at the second end portion thereof. A plurality of longitudinal holes extend between the first and second end portions of the elongated crankarm body. Only one of the longitudinal holes intersects the axle fastener engagement hole and none of the longitudinal holes intersects the pedal axle mounting hole.

In another embodiment of the present invention, a crankset comprises an axle assembly, a drive-side crankarm, and a non-drive crankarm. The axle assembly, the drive-side crankarm, and the non-drive crankarm each have a respective first end portion and a respective second end portion. The drive-side crankarm includes an axle assembly receiving receptacle and an axle fastener mounting hole both integral therewith at the first end portion thereof. The axle fastener mounting hole extends through the drive-side crankarm and is exposed within a cavity of the axle assembly receiving receptacle. The first end portion of the axle assembly is engaged within the cavity of the axle assembly receiving receptacle of the drive-side crankarm. A threaded fastener structure of the axle assembly is threadedly engaged within the axle fastener engagement hole. The non-drive crankarm is attached at the first end portion thereof to the second end portion of the axle assembly. Each one of the crankarms has a plurality of longitudinal holes therein extending between the first and second end portions thereof. Only one of the longitudinal holes of the drive-side crankarm intersects the axle fastener engagement hole.

In another embodiment of the present invention, a bicycle crankset comprises an axle assembly, a drive-side crankarm, and a non-drive crankarm. The an axle assembly, the drive-side crankarm, and the non-drive crankarm each have a respective first end portion and a respective second end portion. The drive-side crankarm is attached at the first end portion thereof to the first end portion of the axle assembly. The non-drive crankarm is attached at the first end portion thereof to the second end portion of the axle assembly. Each one of the crankarms has a plurality of longitudinal holes therein extending between the first and second end portions thereof. The longitudinal holes each extend through an end face of a respective one of the crankarms at the first end portion thereof. The drive-side crankarm is bent inwardly toward the second end portion of the axle assembly after the longitudinal holes are formed therein.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
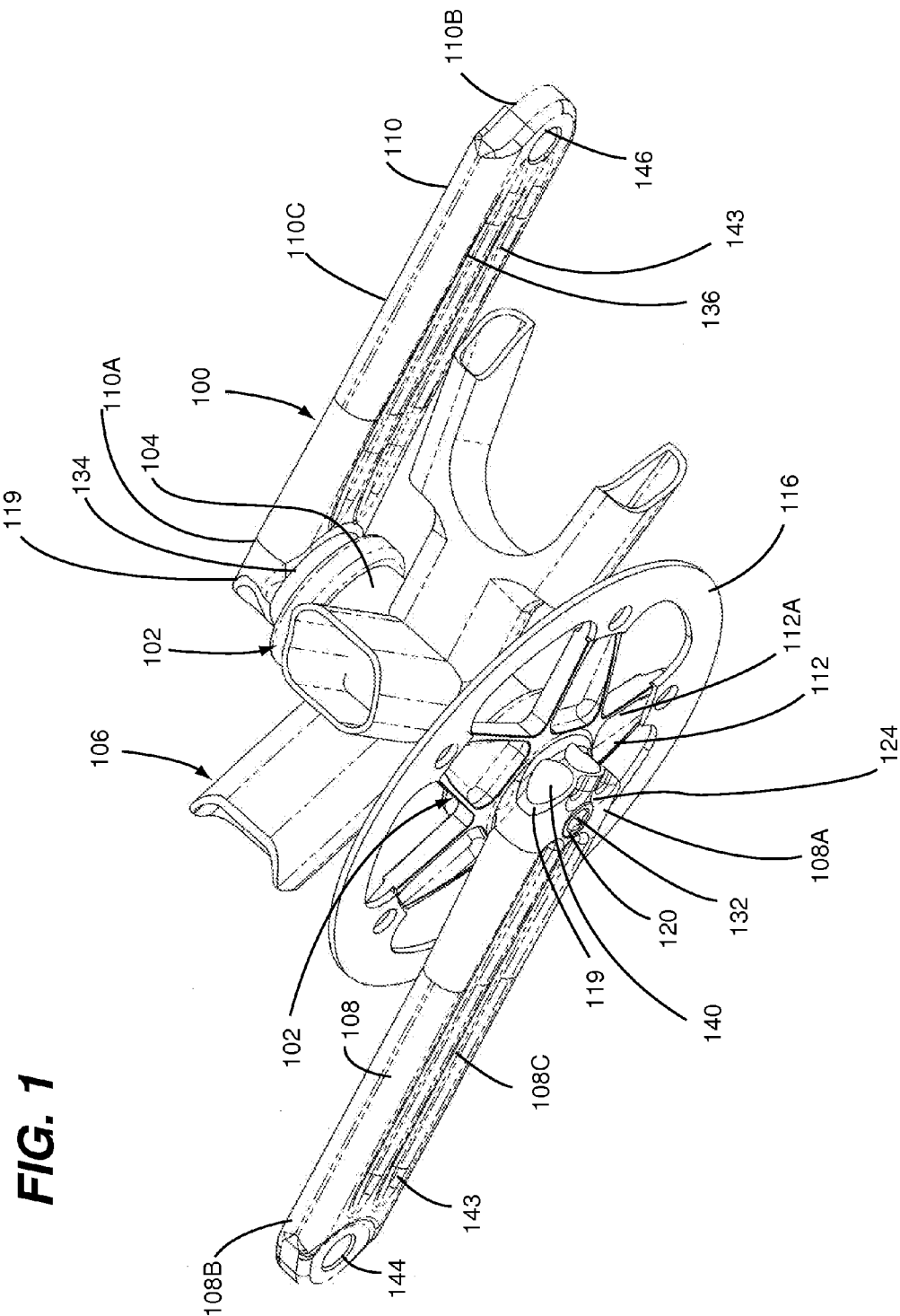
FIG. 1 is a perspective view showing a crankset configured in accordance with an embodiment of the present invention, as installed in a bottom bracket portion of a bicycle frame.

Referring to FIGS. 1-4, a crankset 100 configured in accordance with an embodiment of the present invention is shown. The crankset 100 is shown mounted on two bearing units 102. The bearing units 102 are mounted within a bottom bracket shell 104 of a bicycle frame 106 (fragmentary portion shown). Each one of the bearing units 102 includes a shell 102A and a bearing 102B mounted within the shell 102A. Although the crankset 100 is shown in use with a bicycle frame, it is disclosed herein that a crankset configured in accordance with the present invention is not limited to use with bicycles. For example, a crankset configured in accordance with the present invention can be used with other types of leg-powered vehicles such as a helicopter, a tri-cycle, a three or four-wheeled vehicle, etc.

It is disclosed herein that the bicycle frame 106 can be of a variety of different types, configurations and/or designs (e.g., a road bike, a full-suspension mountain bike, etc) and, thus, a crankset configured in accordance with the present invention is not limited to use in any particular type, configuration or design of bicycle frame. Similarly, although the bearing units 102 are arranged in a configuration commonly referred to as "outboard" (i.e., outboard of the bottom bracket shell), a crankset configured in accordance with the present invention is not limited to being configured for use with any specific type of the bearing arrangement. For example, a crankset configured in accordance with the present invention can be configured for use with bearing units arranged in a configuration commonly referred to as "BB30", which has cartridge bearings directly mounted within the bottom bracket shell. In view of the disclosures made herein, a skilled person will appreciate that a crankset configured in accordance with the present invention can be configured for use with industry-standard bottom bracket arrangements and/or proprietary bottom bracket arrangements.

The crankset 100 includes a drive-side crankarm 108, a non-drive crankarm 110, a spider 112, an axle assembly 114, and a chainring 116. The drive-side crankarm 108, a non-drive crankarm 110 are both examples of elongated crankarm bodies configured in accordance with the present invention. For illustrative purposes, the chainring 114 is shown without teeth that are standard features of a chainring. The drive-side crankarm 108, the non-drive crankarm 110, and an axle 117 of the axle assembly 114 each have a respective first end portion and a respective second end portion. The first and second end portions 117A, 117 B of the axle 117 define corresponding first and second end portions of the axle assembly 114. The drive-side crankarm 108 is attached at its first end portion 108A to the first end portion 117A of the axle 117. The non-drive crankarm 110 is attached at its first end portion 110A to the second end portion 117B of the axle 117. As will be discussed below in greater detail, the drive-side crankarm 108 and the non-drive crankarm 110 are engaged with the axle 117 in a manner than limits (e.g., precludes) relative rotational movement between the axle 117 and each one of the crankarms 108, 110.

Referring to FIGS. 1-5, the drive-side crankarm 108 includes an axle assembly receiving receptacle 118 and an axle fastener mounting hole 120. Both the axle assembly receiving receptacle 118 and the axle fastener mounting hole 120 are integral with the first end portion 108A of the drive-side crankarm 108. The axle assembly receiving receptacle 118 of the drive-side crankarm 108 extends from an inboard side face 121 of the drive-side crankarm 108. The axle fastener mounting hole 120 extends through the drive-side crankarm 108 and is exposed within a cavity 122 of the axle assembly receiving receptacle 118. Furthermore, the axle assembly receiving receptacle 118 and the axle fastener mounting hole 120 both share a common rotational axis. The first end portion 117A of the axle 117 is engaged within the cavity 122 of the axle assembly receiving receptacle 118 of the drive-side crankarm 108. Splines at the first end 117A of the axle 117 matingly engage splines within the cavity 122 of the axle assembly receiving receptacle 118, thereby limiting (e.g., precluding) relative rotational movement between the axle 117 and the drive-side crankarm 108.

A distinguishing aspect of the crankset 100 is that threaded engagement between a threaded fastener structure 124 of the axle assembly 114 and the axle fastener mounting hole 120, which has mating threads provided therein, serves to engage and disengage the splines at the first end 117A of the axle 117 from splines within the cavity 122 of the axle assembly receiving receptacle 118. The threaded fastener structure 124 is rotatingly coupled at its base portion 126 to the first end portion 117A of the axle 117. In one embodiment, the base portion 126 of the threaded fastener structure 124 is rotatingly secured within a pocket 128 at the first end portion 117A of the axle 117 by a lock ring 130 that engages a groove within the pocket 128. In this manner, the threaded fastener structure 124 can rotate with respect to the axle 117. The first end portion 117A of the axle 117 is drawn into the axle assembly receiving receptacle 118 of the drive-side crankarm 108 by threadedly engaging a tip portion 132 (i.e., bolt portion) of the threaded fastener structure 124 into engagement within the axle fastener mounting hole 120 (i.e., rotating the tip portion 132 in a first rotational direction). Similarly, extracting the first end portion 117A of the axle 117 from within the axle assembly receiving receptacle 118 of the drive-side crankarm 108 is accomplished by disengaging the tip portion 132 of the threaded fastener structure 124 from engagement within the axle fastener mounting hole 120 (i.e., rotating the tip portion 132 in a second rotational direction opposite the first rotational direction). Optionally, but not necessarily, the splined interface between the drive-side crankarm 108 and the axle 117 has an interference fit so as to aid in providing a rigid coupling between the drive-side crankarm 108 and the axle 117.

Figure 2:
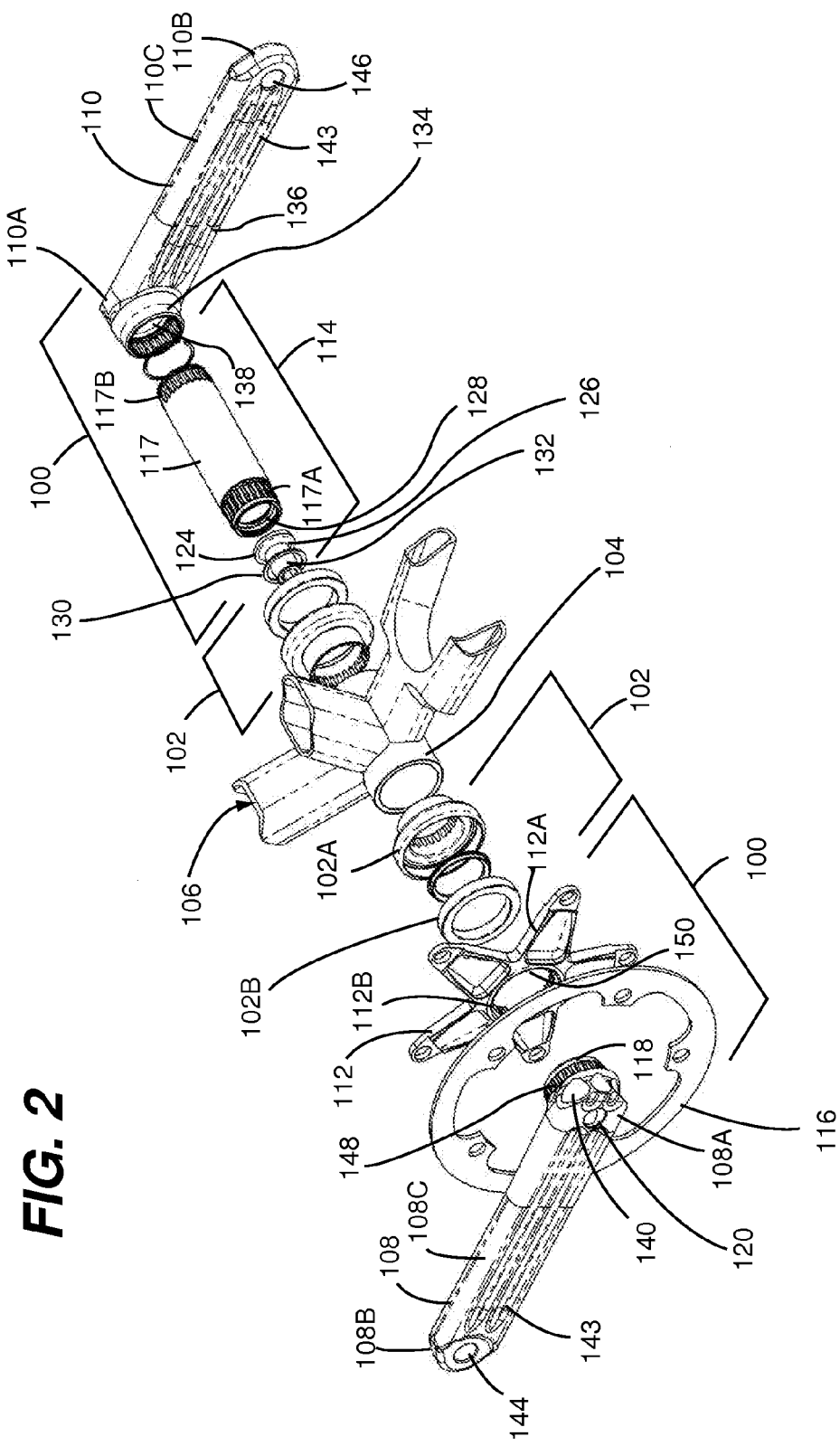
FIG. 2 is an exploded view of the crankset shown in FIG. 1
Figure 3:
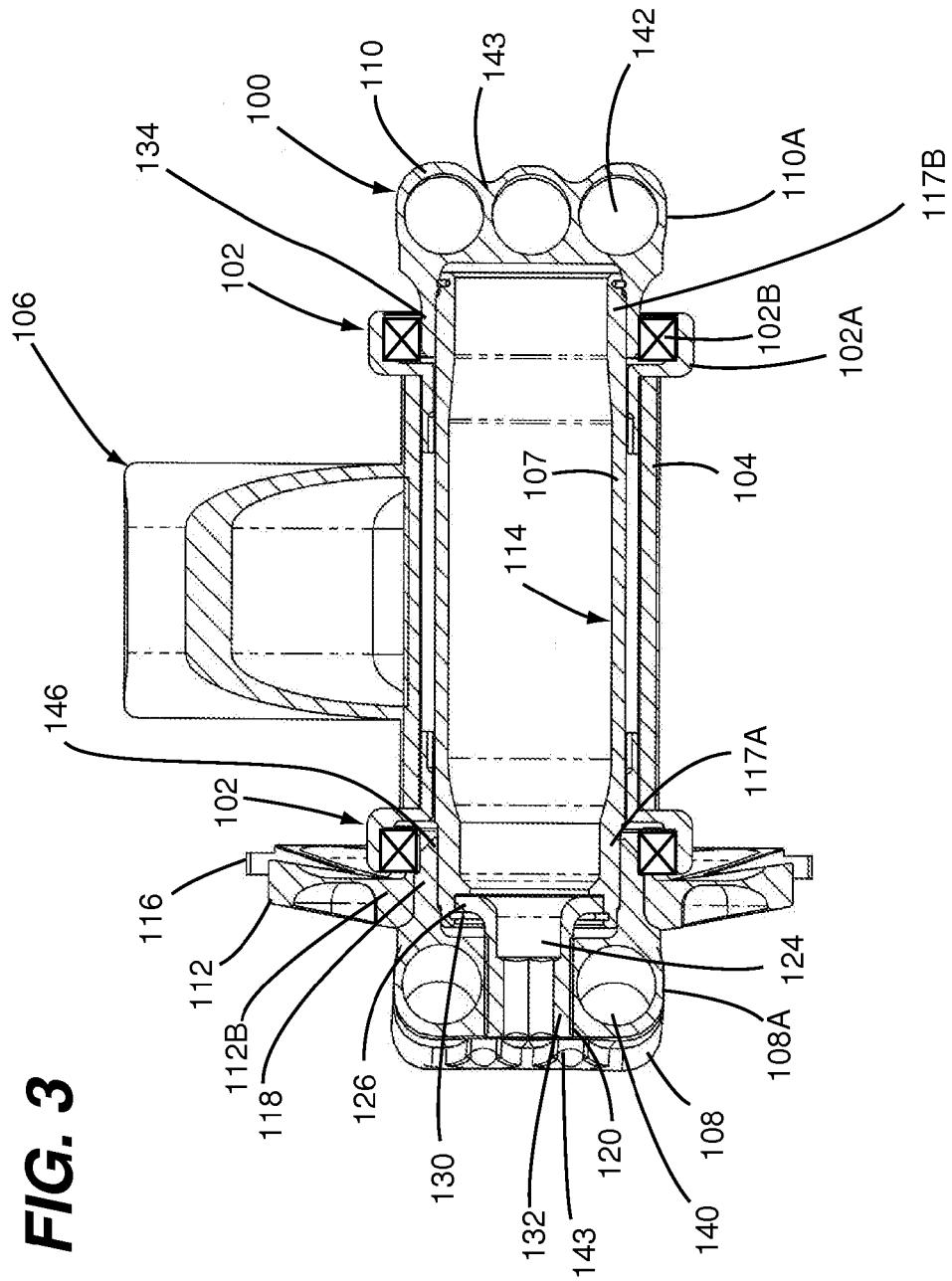
FIG. 3 is a cross-sectional view taken along the line 3-3 in FIG. 1.
Figure 4:
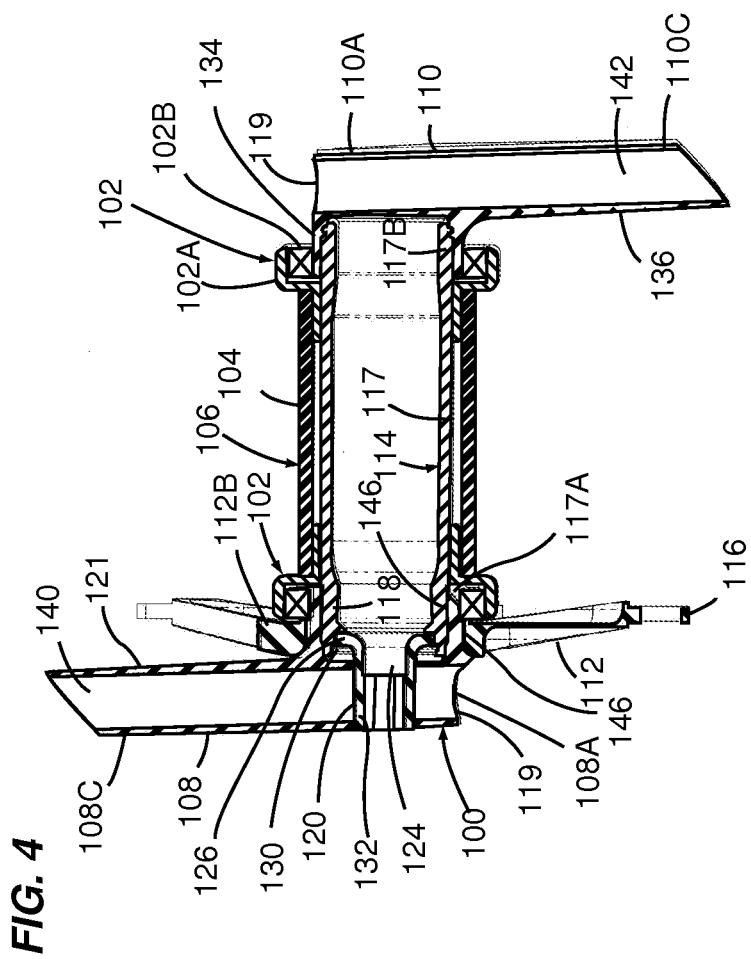
FIG. 4 is a cross-sectional view taken along the line 4-4 in FIG. 1.

Referring to FIGS. 1-4, the non-drive crankarm 110 includes an axle assembly receiving receptacle 134 that is integral with the first end portion 110A of the non-drive crankarm 110. The axle assembly receiving receptacle 134 of the non-drive crankarm 110 extends from an inboard side face 136 of the non-drive crankarm 110. The second end portion 117A of the axle 117 is engaged within a cavity 138 of the axle assembly receiving receptacle 134. Splines at the second end 117A of the axle 117 matingly engage splines within the cavity 138 of the axle assembly receiving receptacle 134, thereby limiting (e.g., precluding) relative rotational movement between the axle 117 and the non-drive crankarm 110. As shown in FIGS. 2-4, a locating/retaining ring or clip 139 can be provided at the second end portion 117B of the axle 117 for engagement with a mating groove within the cavity 138 of the axle assembly receiving receptacle 134. Preferably, the splined interface between the non-drive crankarm 110 and the axle 117 has an interference fit so as to aid in providing a rigid coupling between the non-drive crankarm 110 and the axle 117.

Advantageously, for the purpose of lightening while maintaining structural integrity and rigidity, the drive-side crankarm 108 has a plurality of longitudinal holes 140 therein and the non-drive crankarm 110 has a plurality of longitudinal holes 142 therein. The longitudinal holes 140, 142 extend between the first and second end portions of the respective one of the crankarms 108, 110 and extend through an end face 119 at the first end portion 108A, 110A of the respective one of the crankarms 108, 110. As depicted, each one of the crankarms 108, 110 includes three longitudinal holes. With respect to the drive-side crank arm, only a central one of the longitudinal holes 140 intersects the axle fastener engagement hole 120. In this manner, the longitudinal holes 140 of the drive-side crankarm 108 do not fully breach the web between the longitudinal holes 140 and, thus, this construction aids in maintaining structural integrity and rigidity at the first end portion 108A of the drive-side crankarm 108. Similarly, none of the longitudinal holes 142 of the non-drive crankarm 110 intersect the cavity 138 of the axle assembly receiving receptacle 134 of the non-drive crankarm 110 such that this construction aids in maintaining structural integrity and rigidity at the first end portion 110A of the non-drive crankarm 110. To aid in maintaining structural integrity and rigidity at the second end portion 108B, 110B of the crankarms 108, 110, none of the longitudinal holes 140, 142 intersect a pedal axle mounting hole 144, 146 at the second end portion 108B, 110B of the respective one of the crankarms 108, 110.

As shown in FIGS. 1-3, in at least one embodiment, channels 143 are provided in the exterior side faces of the crankarms 108, 110. The channels 143 are formed (e.g., via milling) adjacent to a space between two adjacent ones of the longitudinal holes 140, 142 of a respective one of the crankarms 108, 110. The channels 143 provide for weight reduction while maintaining structural integrity and rigidity over the length of the crankarms 108, 110.

With respect to the drive-side crankarm 108, the spider 112 is mounted on a splined exterior surface 148 of the axle assembly receiving receptacle 118. Splines on an interior surface of a central bore 150 of a hub portion 112B of the spider 112 engage the splined exterior surface 148 of the axle assembly receiving receptacle 118. In this manner, the splined interface between the driver-side crankarm 108 and the spider 112 limits (e.g., precludes) relative rotation of the spider 112 with respect to the drive-side crankarm 108. In contrast to prior art cranksets, in a preferred embodiment of the present invention (shown), the spider 112 is constrained from lateral movement through compressive engagement (i.e., abutment) between the drive-side crank arm 108 and the drive-side bearing unit 102. With the spider manually engaged at least partially onto the mating splines of the drive-side crankarm 108, engagement of the drive-side crankarm 108 with the axle 117 causes the hub portion 112B of the spider 112 to become compressively engagement between the drive-side crank arm 108 and an inner race of the drive-side bearing unit 102.

As depicted, the spider 112 has a single chainring (i.e., chainring 116) engaged therewith. It is disclosed herein that the spider 112 is configured for having a single chainring engaged therewith or for having a plurality of chainrings engaged therewith. For example, the spider 112 can have a second engaged therewith on an opposite side of arms 112A on which the chainring 116 is engaged. For the depicted embodiment of the spider 112, such a dual chainring configuration would result in the spider arms 112A being disposed between the two chainrings with both chainrings having a common bolt circle diameter (BCD). In another embodiment, a crankset configured in accordance with the present invention can be configured in a manner whereby two or more chainrings can be mounted on a common side of spider arms thereof. In such a same-side chainring configuration, the spider can be configured such that at least two chainrings mounted thereon have a common BCD or, alternatively, the spider can be configured such that at least two chainrings mounted thereon have substantially different BCDs.

Referring now to FIGS. 3 and 4, an external surface of the axle assembly receiving receptacle 118, 134 of each one of the crankarms 108, 110 serves as the mating surface for inner race of the bearing 102B of a respective one of the bearing units 102. The external surface of the axle assembly receiving receptacle 118, 134 of each one of the crankarms 108, 110 is engaged within the inner bore of the respective bearing 102B. The external surface of the axle assembly receiving receptacle 118, 134 of each one of the crankarms 108, 110 external surface of the axle assembly receiving receptacle 118, 134 of each one of the crankarms 108, 110 and the inside diameter of the inner race of the bearing 102B are jointly configured to provide a close tolerance fit (e.g., close tolerance slip fit, close tolerance interference fit, etc). In one embodiment, the bearing units 102 are preferably what are referred in the bicycle industry as over-size bearings (e.g., in accordance with the BB30 standard).

Figure 5:
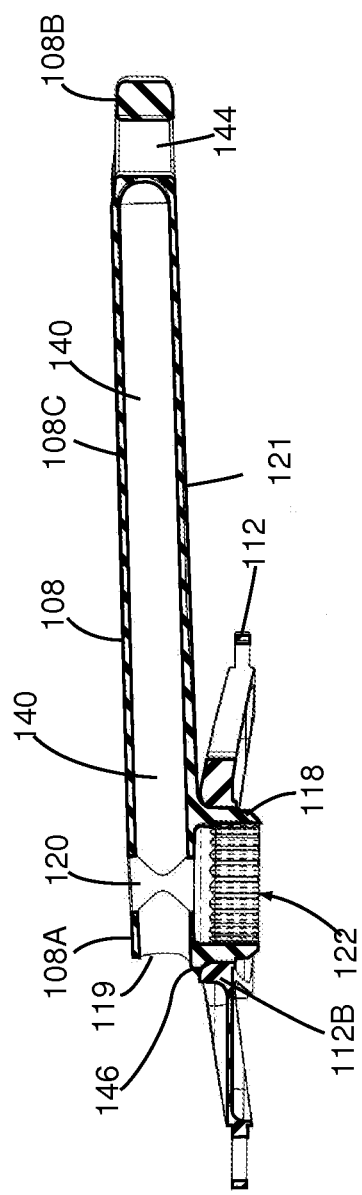
FIG. 5 is a cross-sectional view showing a drive-side crankarm subassembly of the crankset shown in FIGS. 1-4 in a straight arm (i.e., non-bent crankarm) configuration.
Figure 6:
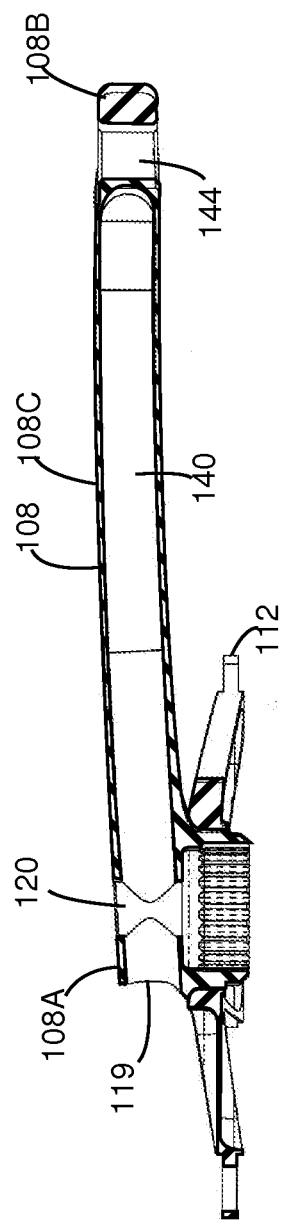
FIG. 6 is a cross-sectional view showing the drive-side crankarm subassembly of FIG. 5 in a bent arm configuration.

As shown in FIGS. 1-5, the drive-side crankarm 108 and the non-drive crankarm 110 have substantially no curvature between their respective first and second end portions, whereby the lever portion 108C, 110C between the first and second end portions of each one of the crankarms 108, 110 is substantially straight. Also, as can be seen in FIGS. 3-5, the lever portion 108C, 110C of both the drive-side crankarm 108 and the non-drive crankarm 110 are outwardly angled with respect to the rotational centerline of the axle 117. Referring to FIG. 6, the drive-side crankarm 108 can be configured to have a prescribed amount of curvature in the lever portion 108C. Similarly, the non-drive crankarm can be configured to have a prescribed amount of curvature in the lever portion 110C. Accordingly, it is disclosed herein that it can be advantageous for one or more reasons (e.g., front derailleur clearance, Q-factor/foot separation distance, etc) for one or both of the crankarms 108, 110 to have lever portion thereof to be curved (e.g., inwardly curved).

In one embodiment, the longitudinal holes 140, 142 of the crankarms 108, 110 are formed by a process that includes removing material from the respective crankarm. Machining techniques such as drilling and boring are examples of such processes for removing material from the respective crankarm 108, 110 for forming the longitudinal holes 140, 142. Preferably, but not necessarily, curvature (e.g., curvature providing inwardly bent profile) in the drive-side crankarm 108 and/or the non-drive crankarm 110 is formed after the longitudinal holes 140,142 are formed therein. Furthermore, such bending may be performed in a manner such that a centerline axis of the axle assembly receiving receptacle is approximately parallel with a centerline axis of the pedal axle mounting hole when a crankarm configured in accordance with the present invention (e.g., the drive-side crankarm) is in the bent/arcuate configuration.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A crankarm for a crankset, comprising:
an elongated crankarm body having a first end portion and a second end portion;
an axle fastener engagement hole extending through the elongated crankarm body at the first end portion thereof;
a pedal axle mounting hole extending through the elongated crankarm body at the second end portion thereof; and
a plurality of longitudinal holes therein extending between said first and second end portions thereof, wherein none of said plurality of longitudinal holes intersects the pedal axle mounting hole, and wherein the axle fastener engagement hole intersects only one of said plurality of longitudinal holes;
wherein the plurality of longitudinal holes includes three side-by-side longitudinal holes;
wherein the axle fastener engagement hole intersects only a center one of said three side-by-side longitudinal holes and
wherein none of said side-by-side longitudinal holes extend through an end face of the elongated crankarm body at the second end portion.

2. The crankarm of claim 1 wherein:
said plurality of longitudinal holes are formed by a process that includes removing material from the elongated crankarm body;
the elongated crankarm body includes a bent portion between said first and second end portions thereof; and
the bent portion is formed by bending the elongated crankarm body after forming said plurality of longitudinal holes.

3. The crankarm of claim 2 wherein:
a centerline axis of the axle fastener engagement hole is approximately parallel with a centerline axis of the pedal axle mounting hole after the bent portion is formed.

4. A crankset, comprising:
an axle assembly having a first end portion and a second end portion;
a non-drive side crankarm having a first end portion and a second end portion, wherein the non-drive side crankarm is attached at the first end portion thereof to the first end portion of the axle assembly; and
a drive side crankarm having a first end portion and a second end portion, wherein the drive side crankarm is attached at a first end portion thereof to the second end portion of the axle assembly;
wherein each one of said crankarms has a plurality of longitudinal holes therein extending between said first and second end portions thereof;
wherein said plurality of longitudinal holes each extend through an end face of a respective one of said crankarms at the first end portion thereof;
wherein the non-drive side crankarm is bent inwardly toward the second end portion of the axle assembly after said longitudinal holes are formed therein;
wherein the non-drive side crankarm includes an axle assembly receiving receptacle and an axle fastener engagement hole both integral therewith at the first end portion thereof; the axle assembly receiving receptacle of the non-drive side crankarm extends from a side face thereof;
wherein the axle fastener engagement hole extends through the non-drive side crankarm and is exposed within a cavity of the axle assembly receiving receptacle;
wherein the first end portion of the axle assembly is engaged within the cavity of the axle assembly receiving receptacle;
wherein a threaded fastener structure of the axle assembly is threadedly engaged within the axle fastener engagement hole; and
wherein only one of said plurality of longitudinal holes of the non-drive side crankarm intersects the axle fastener engagement hole.

5. The crankset of claim 4 wherein:
the drive side crankarm includes an axle assembly receiving receptacle integral therewith at the first end portion thereof;
the axle assembly receiving receptacle of the drive side crankarm extends from a side face thereof;
the second end portion of the axle assembly is engaged within a cavity of the axle assembly receiving receptacle; and
none of said plurality of longitudinal holes of the drive side crankarm intersect the cavity of the axle assembly receiving receptacle.

6. The crankset of claim 4 wherein:
a pedal axle mounting hole extends through the non-drive side crankarm at the second end portion thereof; and
a centerline axis of the axle fastener engagement hole is approximately parallel with a centerline axis of the pedal axle mounting hole.

7. A crankset, comprising:
an axle assembly having a first end portion and a second end portion;
a non-drive side crankarm having a first end portion and a second end portion, wherein the non-drive side crankarm is attached at the first end portion thereof to the first end portion of the axle assembly; and
a drive side crankarm having a first end portion and a second end portion, wherein the drive side crankarm is attached at a first end portion thereof to the second end portion of the axle assembly;

wherein each one of said crankarms has a plurality of longitudinal holes therein extending between said first and second end portions thereof;

wherein said plurality of longitudinal holes each extend through an end face of a respective one of said crankarms at the first end portion thereof;

wherein the non-drive side crankarm is bent inwardly toward the second end portion of the axle assembly after said longitudinal holes are formed therein;

wherein said plurality of longitudinal holes of the non-drive side crankarm are formed by a process that includes removing material from the non-drive side crankarm;

wherein said inwardly bent configuration of the non-drive side crankarm is created after said plurality of longitudinal holes are formed in the non-drive side crankarm;

wherein the non-drive side crankarm includes an axle assembly receiving receptacle and an axle fastener engagement hole both integral therewith at the first end portion thereof; the axle assembly receiving receptacle of the non-drive side crankarm extends from a side face thereof;

wherein the axle fastener engagement hole extends through the non-drive side crankarm and is exposed within a cavity of the axle assembly receiving receptacle;

wherein the first end portion of the axle assembly is engaged within the cavity of the axle assembly receiving receptacle;

wherein a threaded fastener structure of the axle assembly is threadedly engaged within the axle fastener engagement hole; and wherein only one of said plurality of longitudinal holes of the non-drive side crankarm intersects the axle fastener engagement hole.

8. The crankset of claim 7 wherein:

the drive side crankarm includes an axle assembly receiving receptacle integral therewith at the first end portion thereof;

the axle assembly receiving receptacle of the drive side crankarm extends from a side face thereof;

the second end portion of the axle assembly is engaged within a cavity of the axle assembly receiving receptacle; and none of said plurality of longitudinal holes of the drive side crankarm intersect the cavity of the axle assembly receiving receptacle.

9. A crankset, comprising:

an axle assembly having a first end portion and a second end portion;

a non-drive side crankarm having a first end portion and a second end portion, wherein the non-drive side crankarm is attached at the first end portion thereof to the first end portion of the axle assembly; and a drive side crankarm having a first end portion and a second end portion, wherein the drive side crankarm is attached at a first end portion thereof to the second end portion of the axle assembly;

wherein each one of said crankarms has a plurality of longitudinal holes therein extending between said first and second end portions thereof;

wherein said plurality of longitudinal holes each extend through an end face of a respective one of said crankarms at the first end portion thereof;

wherein the non-drive side crankarm is bent inwardly toward the second end portion of the axle assembly after said longitudinal holes are formed therein;

wherein said longitudinal holes of the non-drive side crankarm are formed by a process that includes removing material from the non-drive side crankarm;

wherein said inwardly bent configuration of the non-drive side crankarm is created after said longitudinal holes are formed in the non-drive side crankarm;

wherein a pedal axle mounting hole extends through the non-drive side crankarm at the second end portion thereof;

wherein a centerline axis of the axle fastener engagement hole is approximately parallel with a centerline axis of the pedal axle mounting hole;

wherein the non-drive side crankarm includes an axle assembly receiving receptacle and an axle fastener engagement hole integral therewith at the first end portion thereof;

wherein the axle assembly receiving receptacle of the non-drive side crankarm extends from a side face thereof;

wherein the axle fastener engagement hole extends through the non-drive side crankarm and is exposed within a cavity of the axle assembly receiving receptacle;

wherein the first end portion of the axle assembly is engaged within the cavity of the axle assembly receiving receptacle; a threaded fastener structure of the axle assembly is threadedly engaged within the axle fastener engagement hole;

wherein only one of said plurality of longitudinal holes of the non-drive side crankarm intersects the axle fastener engagement hole;

wherein the drive side crankarm includes an axle assembly receiving receptacle integral therewith at the first end portion thereof;

wherein the axle assembly receiving receptacle of the drive side crankarm extends from a side face thereof;

wherein the second end portion of the axle assembly is engaged within a cavity of the axle assembly receiving receptacle; and wherein none of said plurality of longitudinal holes of the drive side crankarm intersect the cavity of the axle assembly receiving receptacle.

* * * * *